United States Patent
Tressler

[11] Patent Number: 5,178,421
[45] Date of Patent: Jan. 12, 1993

[54] GARDEN HOSE MENDER

[76] Inventor: Paul S. Tressler, R.D. 1, Box 68, Markleton, Pa. 15551

[21] Appl. No.: 743,112

[22] Filed: Aug. 9, 1991

[51] Int. Cl.⁵ .............................................. F16L 55/00
[52] U.S. Cl. ...................................... 285/23; 285/243; 285/423
[58] Field of Search ...................... 285/243, 253, 23, 5, 285/423

[56] References Cited

U.S. PATENT DOCUMENTS

| | | | |
|---|---|---|---|
| 1,043,683 | 11/1912 | Fieser | 285/243 X |
| 2,815,227 | 12/1957 | Cullen et al. | 285/23 |
| 4,039,212 | 8/1977 | Skarud | 285/253 |
| 4,411,460 | 10/1983 | Beal | 285/243 |
| 4,738,475 | 4/1988 | Ebert | 285/243 X |

FOREIGN PATENT DOCUMENTS 158642 2/1921 United Kingdom ................ 285/243
334935 9/1930 United Kingdom ................ 285/243

Primary Examiner—Dave W. Arola
Attorney, Agent, or Firm—Reed Smith Shaw & McClay

[57] ABSTRACT

A flexible hose mending apparatus including an adaptor portion and a clamping portion having cooperating engagement structure. The engagement structure preferably includes an outwardly projecting flange provided on an end of the adaptor portion adapted for insertion into the flexible hose and inwardly projecting ribs provided on notched areas of shell sections of the clamping portion. The flange and the ribs serve to retain the clamping portion on the adaptor portion when the adaptor portion is detached from the flexible hose and also to localize the clamping force applied to the flexible hose by the clamping portion when the adaptor portion is inserted therein.

11 Claims, 2 Drawing Sheets

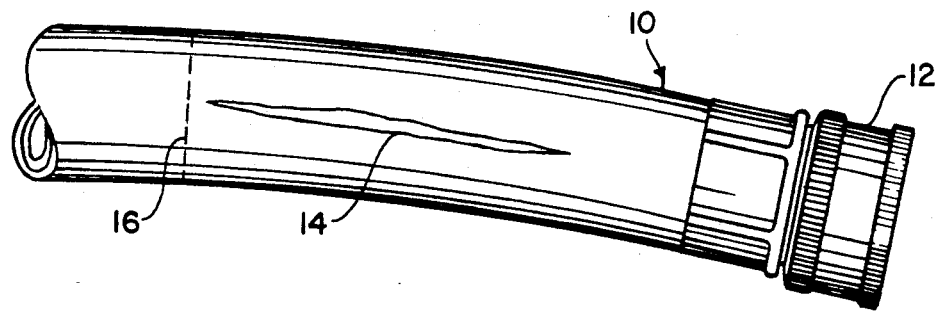
FIG. 1
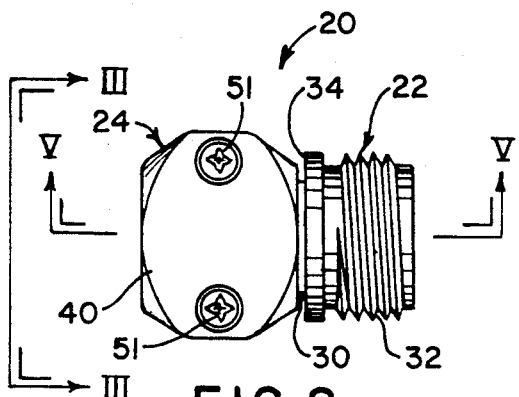
FIG. 2
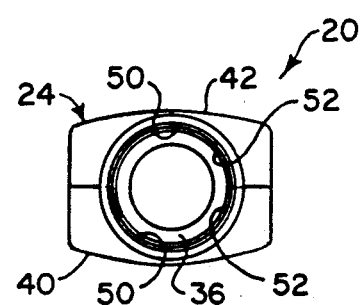
FIG. 3
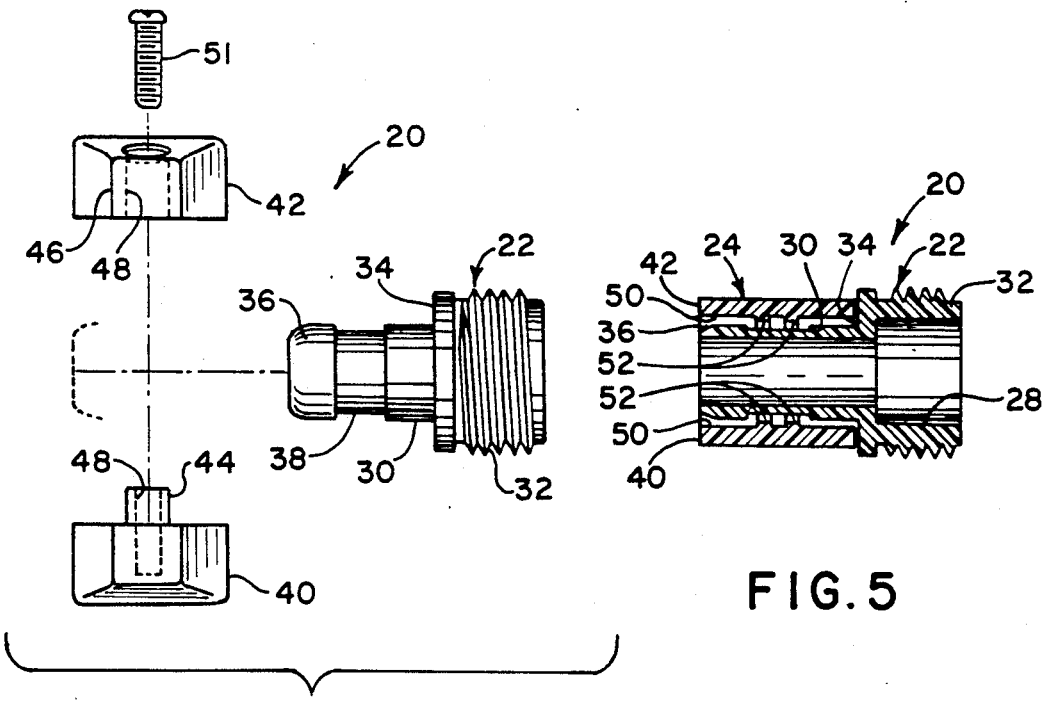
FIG. 4
FIG. 5

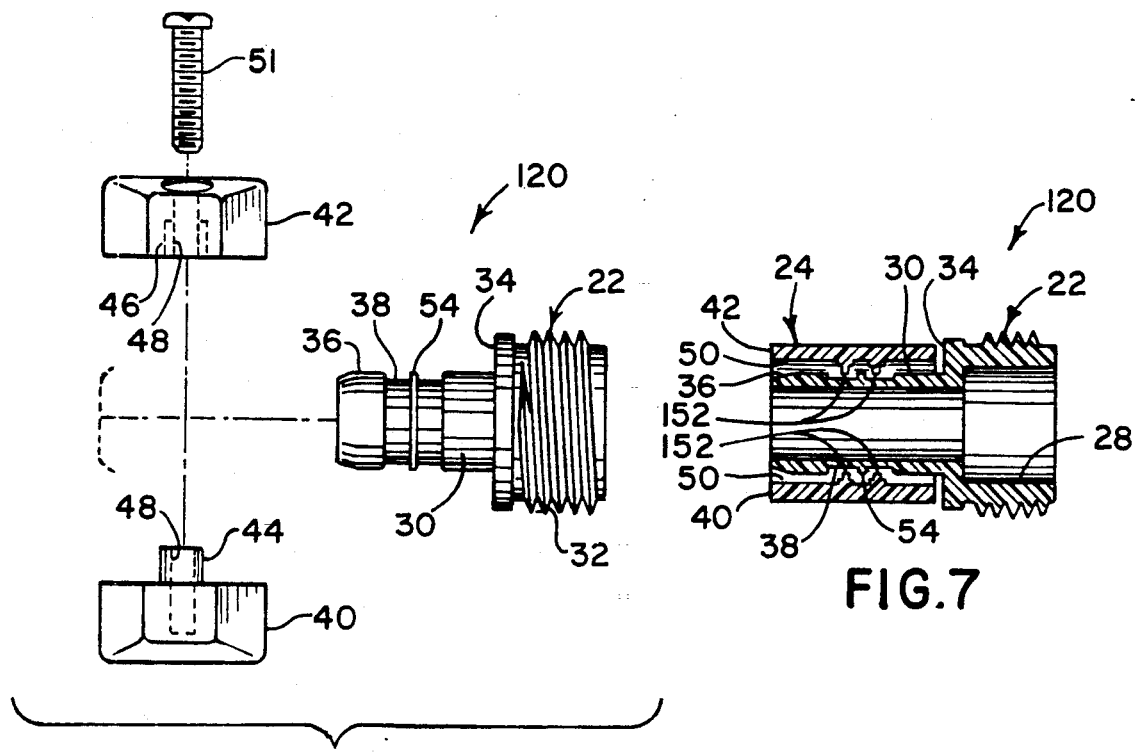
FIG.6
FIG.7
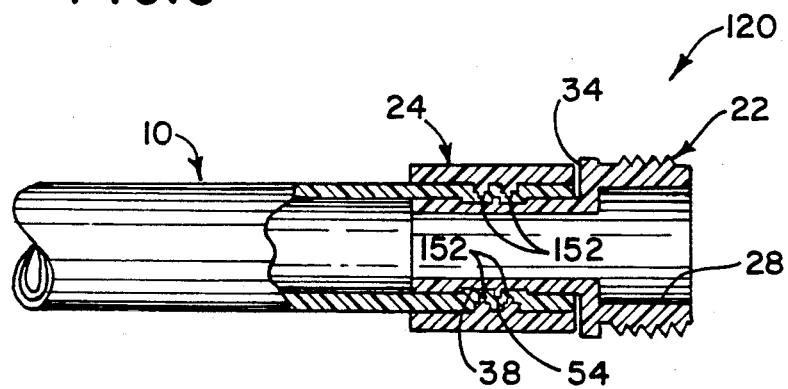
FIG.8
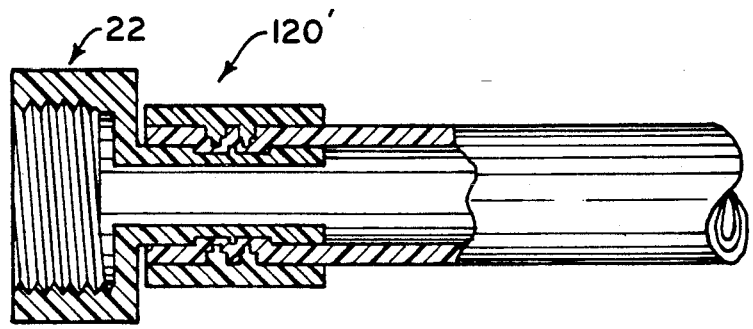
FIG.9

GARDEN HOSE MENDER

FIELD OF THE INVENTION

The present invention relates generally to repair apparatus and, more particularly, to apparatus for mending a flexible conduit such as a garden hose or the like.

BACKGROUND OF THE INVENTION

Currently, when a flexible conduit such as a conventional garden hose becomes split, punctured or otherwise damaged, the damage is commonly repaired either by wrapping adhesive tape around the damaged area or by installing in the damaged region a commercially available hose mending apparatus. Wrapping adhesive tape around the damaged area of the hose may temporarily repair the hose; however, such solution is essentially a stopgap measure which either must be frequently repeated or used as a temporary repair until a more permanent hose mending apparatus can be installed.

In the event a long-lasting repair is desired, or perhaps the hose is to be shortened, a suitable hose mending apparatus such as, for example, that shown in U.S. Pat. No. 4,411,460 or the type currently manufactured by Green Garden, Inc. of Somerset, Pa., is typically installed. Hose menders of this sort normally comprise a sleeve-like adaptor portion and a clamping portion. The adaptor portion is normally a tubular member having a first end designed for insertion into the damaged hose and a second end provided with either external or internal threading compatible for threaded connection to a suitable female or male hose coupling or to the spout of a faucet. The clamping portion may take the form of any functional hose clamping mechanism that can apply radially inwardly directed force to the hose whereby the hose becomes sealingly and compressively attached to the first end of the adaptor portion. In the hose mending apparatus of the type manufactured by Green Garden, Inc., the clamping mechanism consists of a pair of mating shells each having a substantially semicircular notch formed in a central portion thereof. When the mating shells are brought into engagement with one another, the semicircular notches cooperate to form an opening within which the hose and the inserted adaptor portion are received. Thereafter, mechanical fasteners, such as self-tapping screws or the like are inserted into aligned openings provided in the shells whereby the shells can be drawn toward one another by tightening the screws, thereby providing the requisite clamping force.

Hose menders of the type thus far discussed suffer from several disadvantages. They must be packaged in costly and cumbersome packaging materials and containers in order to assure that the adaptor and clamping portions do not become accidentally separated during shipping and handling. Further, their configuration is such that, when attached to a hose, the clamping force that they apply to the hose is somewhat limited. As a result, if relatively moderate tension is applied to the hose, the hose may become unintentionally detached from the adaptor portion, thereby requiring the user to disassemble the hose mender and reinstall it on the hose before the hose can be again be rendered functional.

An advantage exists, therefore, for a hose mending apparatus of a construction that is inexpensive to manufacture and ship yet also capable of applying sizable gripping or clamping force to a hose such that the integrity of the connection between the hose mending apparatus and the hose is effectively maintained notwithstanding the level of tensile force applied to the hose.

SUMMARY OF THE INVENTION

The present invention provides a hose mending apparatus having an adaptor portion and a clamping portion. The adaptor portion is a tubular member having a first end adapted for insertion into a severed hose and a second end provided with either external or internal threading compatible for threaded attachment to a suitable female or male hose coupling or to the spout of a faucet. The clamping portion includes a clamping mechanism comprising a pair of mating shells each having a substantially semicircular notch formed in a central portion thereof. Within each notch is a pair of raised ribs of sufficient depth to straddle a raised flange provided in a groove formed on a shaft section of the first end of the adaptor portion. When the mating shells are brought into engagement with one another in the absence of a hose, as in the case wherein the hose mender is being shipped or displayed for retail sale, the raised ribs engage the raised flange so as to prevent the clamping portion from being accidentally detached and separated from the adaptor portion. When the mating shells are brought into engagement with one another after the adaptor portion is inserted into a hose, the semicircular notches cooperate to form an opening within which the hose and the inserted adaptor portion are received. Mechanical fasteners, preferably self-tapping screws, are inserted into aligned openings provided in the shells whereby the shells can be drawn toward one another by tightening the screws, thereby providing the requisite clamping force.

Because of the cooperating engagement means provided on the adaptor portion and the clamping portion, i.e., the raised flange on the adaptor portion and the pair of raised ribs on the clamping portion, several advantages are realized. First, since the adaptor and clamping portions may be positively interconnected via the flange and ribs, the hose mending apparatus can be shipped and sold in bulk (as in bins, for example), thereby resulting in an economy in packaging and shipping costs and, ultimately, in a less expensive consumer product. Equally as important, when installed onto a hose, the flange and ribs press rather deeply into the inner and outer walls of the hose and act to localize and, therefore, increase the clamping force applied by the clamping portion to the hose. Consequently, the tensile force required to detach the hose from the adaptor portion is dramatically increased in relation to known hose mender devices.

Other details, objects and advantages of the present invention will become apparent as the following description of the presently preferred embodiments and presently preferred methods of practicing the invention proceeds.

BRIEF DESCRIPTION OF THE DRAWINGS

The invention will become more readily apparent from the following description of preferred embodiments thereof shown, by way of example only, in the accompanying drawings, wherein:

FIG. 1 is a fragmentary view of a damaged garden hose;

FIG. 2 is a plan view of a conventional hose mender apparatus;

FIG. 3 is a view taken along line III—III of FIG. 2;

FIG. 4 is an exploded perspective view of the hose mender apparatus of FIG. 2;

FIG. 5 is a view taken along line V—V of FIG. 2;

FIG. 6 is an exploded perspective view of a preferred embodiment of the hose mender apparatus of the present invention;

FIG. 7 is a longitudinal section view, similar to FIG. 5, taken through the preferred embodiment of the hose member apparatus of the present invention;

FIG. 8 is view similar to FIG. 7 depicting the hose mender apparatus of the present invention attached to a garden hose; and FIG. 9 is a view similar to FIG. 8 depicting a further preferred embodiment of the hose mender apparatus of the present invention attached to a garden hose.

DETAILED DESCRIPTION OF THE INVENTION

Turning to the drawing figures, there is depicted in FIG. 1 a fragment of a typical soft-walled flexible garden hose 10 that, as is known, may be formed of reinforced or unreinforced rubber or plastic. Hose 10 is provided with a coupling 12 which is shown as a female coupling but, as will be appreciated, could be either a male or a female coupling having threading compatible for threaded connection to another suitable male or female hose coupling or to the spout of a faucet.

Reference numeral 14 designates a laceration or puncture in the wall of the hose, the long-term repair of which involves installation of a hose mender apparatus. Installation of such apparatus typically involves severing the hose at a desired location therealong, as is represented by dashed line 16, inserting an adaptor portion of a hose mender apparatus into the severed portion and clamping the hose about the adaptor portion. If the hose repair is performed near an end of the hose the repair can be performed using a single hose mender apparatus and the adaptor portion is normally selected such that it has a coupling having threading, either internal or external, like the original hose coupling which it replaces, i.e., if the original hose coupling being replaced is a male coupling then, normally, so too is the replacement coupling. If, however, the hose repair is performed generally in a central region along the length of the hose, two hose mender apparatus are typically involved wherein one portion of the hose will be fitted with a replacement adaptor having a male coupling and the other hose portion will be fitted with a replacement adaptor having a mating female coupling. So fitted, the couplings can be joined to produce a repaired hose of substantially the same length as the original hose. Such installations are also contemplated by the hose mending apparatus of the present invention to be described in detail hereinafter.

FIGS. 2-5 reveal hose mending apparatus of a type suitable for use in performing the above-described mending operations and corresponds substantially to that of the hose mending apparatus manufactured by Green Garden, Inc. of Somerset, Pa. The apparatus, designated by reference 20, is comprised of an adaptor portion 22 and a clamping portion 24. Both the adaptor and clamping portions are formed of rigid materials, including, but not limited to, moldable synthetic resinous plastic materials. Adaptor portion 22 includes a tubular member having a fluid passageway 28, a first end 30 adapted for insertion into a severed end of a hose (such as hose 10 at location 16), and a second end 32 provided with either external or internal threading compatible for threaded connection to a suitable female or male hose coupling or to the spout of a faucet. In FIGS. 2-5, the coupling or second end 32 of the adaptor portion 22 is depicted as a male coupling.

The first and second ends of the adaptor portion 22 are stepped in diameter so as to form a shoulder 34 against which a severed end of a hose (not illustrated) abuts when the first end 30 is fully inserted thereinto. The first end 30 of the adaptor portion assumes the general configuration of a circular shaft having a tip 36 situated opposite the threaded second end 32 of the adaptor portion that is normally tapered to facilitate its insertion into the severed hose. In an intermediate region between shoulder 34 and tapered tip 36 the first end 30 of adaptor portion 22 is provided with a reduced diameter recess 38, the function of which will be described in greater detail hereinafter.

The clamping portion 24 comprises first and second mating shells 40 and 42. The shells are mating in the sense that, although they enjoy generally the same overall configurations, one shell, shell 40 in FIG. 3, is provided with outwardly projecting posts 44 which are received in mating sockets 46 formed in shell 42. Each of the posts 44 and sockets 46 also possess a bore 48 such that when the posts 44 and sockets 46 are properly mated, the bores 48 align to form continuous fastener receiving passageways.

As is perhaps most clearly depicted in FIGS. 3 and 5, shells 40 and 42 each have a substantially semicircular notch 50 formed in a central portion thereof. Within each notch 50 raised rib means 52 are provided. When the adaptor portion 22 is inserted into a hose and mating shells 40 and 42 are brought into engagement with one another via posts 44 and sockets 46, the notches 50 cooperate to form an opening within which the hose and the inserted adaptor portion are received. Thereafter, mechanical fasteners such as self-tapping screws 51 (FIGS. 2 and 4) are introduced into the aligned passageways provided by bores 48 and then tightened to enable the clamping mechanism to clamp about the hose and the first end 30 of adaptor portion 22 of hose mending apparatus 20. As is perhaps already apparent to the reader, the rib means 52 serve to press the wall of the hose into the recess 38 formed in the first end of adaptor portion 22 when the clamping portion 24 is clamped thereabout so as to enhance retention of the adaptor portion within the hose against tensile forces that may be applied to the hose. While retention is improved somewhat by the presence of this feature, the tensile force resistance produced thereby is relatively limited in comparison to that provided by the hose mending apparatus of the present invention to be described later herein.

FIGS. 3 and 5 additionally reveal that the opening formed by the notches 50 and the radially innermost projection of the rib means 52 forms an opening which is larger than the largest diameter regions, i.e., those regions on either side of recess 38, of the first end 30 of the adaptor portion 22. Thus, if they were not, during shipping and sale, physically attached as by a fastener or tether, or enclosed within packaging materials, the clamping portion would simply slide off of the adaptor portion and likely become lost. Hence, the known hose mending apparatus 20 must be shipped and sold using costly packaging materials and containers which detrimentally affect the consumer cost of the product.

Turning to FIGS. 6-8, there is illustrated a hose mending apparatus 120 constructed in accordance with a preferred embodiment of the present invention. Apparatus 120 is similar in many regards to apparatus 20 shown in FIGS. 1-5 and, in this connection, those elements of apparatus 120 which are of the same or substantially the same construction as their counterparts illustrated in FIGS. 1-5 bear the same reference numerals as those elements. Further, those elements which have been previously described will not be further described in detail except in instances where it is believed that further amplification would assist the reader in appreciating the structure and function of the hose mending apparatus 120.

As seen in each of FIGS. 6, 7 and 8, the recess 38 of the first end 30 of the adaptor portion 22 has projecting therefrom a radically directed, preferably continuous flange, herein designated by reference numeral 54. In cooperation therewith, the substantially semicircular notches 50 of the shells 40 and 42 of the clamping portion 24 are provided with rib means in the form of at least one, but preferably two, ribs 152 projecting a sufficient distance from their associated notch so as to overlap the radially outermost extents of the flange 54 and the regions of the first end 30 on either side of the recess 38. Provision of the flange 54 thus separates the recess 38 into two substantially parallel circumferential grooves about the shaft of the first end 30 into which project the ribs 152 of shells 40 and 42 when the shells are assembled about the adaptor portion, as in FIG. 7. As a result, when shells 40 and 42 are mated by posts 44 and sockets 46 about the first end 30 of adaptor portion 22 in the manner shown in FIG. 7, the coupling portion 24 cannot slide along first end 30 and become detached from the adaptor portion 22. Therefore, no mechanical fasteners or special packaging is required to secure the adaptor portion to the clamping portion. As a consequence, the hose mending apparatus 120 can be shipped and sold in bulk at reduced retail cost relative to hose mending apparatus 20 of FIGS. 1-5.

Looking at FIG. 8, it will be observed that when installed onto a flexible hose 10 the salient flange 54 and ribs 152 cooperate with one another to press deeply into the wall of the hose to localize and increase the clamping force applied by the clamping portion to the hose 10 and the inserted adaptor portion. As a result the tensile force required to detach the hose from the adaptor portion is significantly greater than that required in the hosing mending apparatus 20.

Further, although a single rib 152 and a single flange 54 would be sufficient to achieve the desired shipping and handling advantage enjoyed by the present invention as well as some of the above described tensile force resistance benefit, it is preferred that the flange 54 be bounded by two ribs 152 as is represented in FIGS. 6-8 in order that the full measure of the tensile strength resistance benefit be realized. Similarly, two or more flanges 54 and three or more ribs 152 can be provided if such is desired or necessary.

FIG. 9 illustrates the female coupling version of the hose mending apparatus of the present invention, herein designated by reference numeral 120'. The adaptor portion 22' of mending apparatus 120' has internal threading and is adapted for threaded connection to the external threading of the adaptor portion 22 of the hose mending apparatus 120 described hereinabove. In all other respects, hose mending apparatus 120' is identical to hose mending apparatus 120.

Although the invention has been described in detail for the purpose of illustration, it is to be understood that such detail is solely for that purpose and that variations can be made therein by those skilled in the art without departing from the spirit and scope of the invention except as it may be limited by the claims.

I claim:

1. Apparatus for mending a flexible hose, said apparatus comprising:
   an adaptor portion including a first end adapted for insertion into said flexible hose, a second end including threading compatible for threaded connection to a coupling, and a fluid passageway extending from said first end to said second end;
   a clamping portion adapted for applying clamping force to compressively attach said flexible hose to said adaptor portion;
   cooperating means carried by said adaptor portion and said clamping portion for retaining said clamping portion on said adaptor portion when said adaptor portion is detached from said flexible hose and for compressively engaging said flexible hose and thereby localizing the clamping force applied to said flexible hose by said clamping portion when said adaptor portion is inserted therein; and
   fastener means for engaging said clamping portion and for producing said clamping force.

2. The apparatus of claim 1 wherein said cooperating means comprises a first structure projecting radially outwardly from said first end of said adaptor portion and a second structure projecting radially inwardly from said clamping portion, wherein said first structure and said second structure radially overlap when said apparatus is detached from said flexible hose and said clamping portion is fitted about said first end of said adaptor portion, said overlap serving to retain said clamping portion on said adaptor portion.

3. The apparatus of claim 2 wherein said first structure comprises at least one flange and said second structure comprises at least one rib.

4. The apparatus of claim 3 wherein said second structure consists of two ribs.

5. The apparatus of claim 3 wherein said first end of said adaptor portion includes a recess formed in an intermediate region thereof.

6. The apparatus of claim 5 wherein said at least one flange is situated in said recess.

7. The apparatus of claim 2 wherein said clamping portion comprises a pair of shells each having a substantially semicircular notch formed therein, said notches cooperating to form an opening for receiving said first end of said adaptor portion when said apparatus is detached from said flexible hose and for receiving said hose and said first end of said adaptor portion when said apparatus is installed on said hose.

8. The apparatus of claim 7 wherein said second structure projects radially inwardly from each of said pair of shells.

9. The apparatus of claim 7 wherein said shells include fastener receiving passageways and said fastener means comprise threaded fasteners adapted for insertion into said passageways.

10. The apparatus of claim 1 wherein said adaptor portion and said clamping portion are formed of plastic.

11. Apparatus for mending a flexible hose, said apparatus comprising:
   a first adaptor portion including a first end adapted for insertion into a first length of said flexible hose, a second end including threading, and a fluid passageway extending from said first end to said second end of said first adaptor portion;

a first clamping portion adapted for applying a clamping force to compressively attach said first length of said flexible hose to said first adaptor portion;

first cooperating means carried by said first adaptor portion and said first clamping portion for retaining said first clamping portion on said first adaptor portion when said first adaptor portion is detached from said first length of said flexible hose and for compressively engaging said first length of said flexible hose and thereby localizing the clamping force applied to said first length of said flexible hose by said first clamping portion when said first adaptor portion is inserted therein;

first fastener means for engaging said first clamping portion and for producing said clamping force applied to said first length of said flexible hose;

a second adaptor portion including a first end adapted for insertion into a second length of said flexible hose, a second end including threading compatible for threaded connection to said threading of said second end of said first adaptor portion, and a fluid passageway extending form said first end to said second end or said second adaptor portion;

a second clamping portion adapted for applying clamping force to compressively attach said second length of said flexible hose to said second adaptor portion;

second cooperating means carried by said second adaptor portion and said second clamping portion for retaining said second clamping portion on said second adaptor portion when said second adaptor portion is detached from said second length of said flexible hose and for compressively engaging said second length of said flexible hose and thereby localizing the clamping force applied to said second length of said flexible hose by said second clamping portion when said second adaptor portion is inserted therein; and second fastener means for engaging said second clamping portion and for producing said clamping force applied to said second length of flexible hose.

* * * * *